United States Patent
Kinoshita (10) Patent No.: US 8,228,880 B2
(45) Date of Patent: Jul. 24, 2012

(54) WIRELESS LAN TERMINAL, A WIRELESS LAN SYSTEM, A MAC ADDRESS LEARNING METHOD AND A COMPUTER PROGRAM PRODUCT

(75) Inventor: Hiroyuki Kinoshita, Shizuoka (JP)

(73) Assignee: NEC Access Technical, Ltd., Shizuoka (JP)

( * ) Notice: Subject to any disclaimer, the term of this patent is extended or adjusted under 35 U.S.C. 154(b) by 1021 days.

(21) Appl. No.: 12/175,627

(22) Filed: Jul. 18, 2008

(65) Prior Publication Data

US 2009/0028121 A1    Jan. 29, 2009

(30) Foreign Application Priority Data

Jul. 25, 2007    (JP) ................. 2007-192724

(51) Int. Cl.
*H04W 4/00* (2009.01)
(52) U.S. Cl. ............ 370/338; 370/401; 370/330
(58) Field of Classification Search .......... None
See application file for complete search history.

(56) References Cited

U.S. PATENT DOCUMENTS

| | | | |
|---|---|---|---|
| 7,099,295 B1 * | 8/2006 | Doyle et al. ................. 370/338 |
| 2003/0031154 A1 * | 2/2003 | Kobayashi et al. ........... 370/338 |
| 2003/0035399 A1 * | 2/2003 | Ishibashi et al. ............... 370/338 |
| 2003/0051132 A1 * | 3/2003 | Kobayashi et al. ........... 713/153 |
| 2004/0213192 A1 * | 10/2004 | Kobayashi .................... 370/338 |
| 2005/0078624 A1 * | 4/2005 | Shu et al. ...................... 370/328 |
| 2006/0029028 A1 * | 2/2006 | Kim et al. ..................... 370/338 |
| 2006/0154609 A1 * | 7/2006 | Takano ...................... 455/67.13 |
| 2007/0091871 A1 * | 4/2007 | Taha ............................. 370/352 |
| 2007/0097919 A1 * | 5/2007 | Tsubota ........................ 370/331 |
| 2007/0211736 A1 * | 9/2007 | Sapek et al. .................. 370/401 |
| 2007/0274211 A1 * | 11/2007 | Tsubota ........................ 370/229 |

FOREIGN PATENT DOCUMENTS

| | | |
|---|---|---|
| JP | 10285200 A | 10/1998 |
| JP | 2000358059 A | 12/2000 |
| JP | 2002084306 A | 3/2002 |
| JP | 2002094516 A | 3/2002 |
| JP | 2004048334 A | 2/2004 |
| JP | 2004349779 A | 12/2004 |
| JP | 2005192059 A | 7/2005 |
| JP | 2005277481 A | 10/2005 |
| JP | 2006135715 A | 5/2006 |

OTHER PUBLICATIONS

Japanese Office Action for JP 2007-192724 issued Apr. 21, 2009.

* cited by examiner

*Primary Examiner* — Bob Phunkulh
(74) *Attorney, Agent, or Firm* — Michael Dryja (57) ABSTRACT

A wireless LAN terminal includes a wired LAN interface, a wireless LAN interface and a bridge unit. The bridge unit detects that a terminal apparatus connected with the wired LAN interface moves to a position under different wireless LAN equipment and learns a MAC address of the terminal apparatus which moves.

23 Claims, 12 Drawing Sheets

| ToDS = 1 | FromDS = 1 | DESTINATION RADIO STATION ADDRESS | SOURCE RADIO STATION ADDRESS | DESTINATION MAC ADDRESS | SOURCE MAC ADDRESS |

Fig.4B

| ToDS = 0 | FromDS = 1 | DESTINATION MAC ADDRESS | BSSID | SOURCE MAC ADDRESS |

Fig.4C

| ToDS = 1 | FromDS = 0 | BSSID | SOURCE MAC ADDRESS | DESTINATION MAC ADDRESS |

| MAC ADDRESS | PORT IDENTIFIER | AGING TIMER |
|---|---|---|
| PC3-1 | LAN | 300 [SECONDS] |
| RADIO ACCESS POINT | WIRELESS LAN | |
| WIRELESS LAN TERMINAL 1-2 | WIRELESS LAN | |
| WIRELESS LAN TERMINAL 1-3 | WIRELESS LAN | |
| PC3-2 | WIRELESS LAN | |

| MAC ADDRESS | AGING TIMER |
|---|---|
| PC3-1 | 300 [SECONDS] |
| ⋮ | ⋮ |

WIRELESS LAN TERMINAL, A WIRELESS LAN SYSTEM, A MAC ADDRESS LEARNING METHOD AND A COMPUTER PROGRAM PRODUCT

INCORPORATED BY REFERENCE

This application is based on Japanese Patent Application No. JP 2007-192724 filed on Jul. 25, 2007, and including a specification, claims, drawings and summary. The disclosure of the above Japanese Patent Application is incorporated herein by reference in its entirety.

TECHNICAL FIELD

The present invention relates to a wireless LAN (Local Area Network) terminal, a wireless LAN system, a MAC (Media Access Control) address learning method and a computer program product.

BACKGROUND ART

Figure 12:
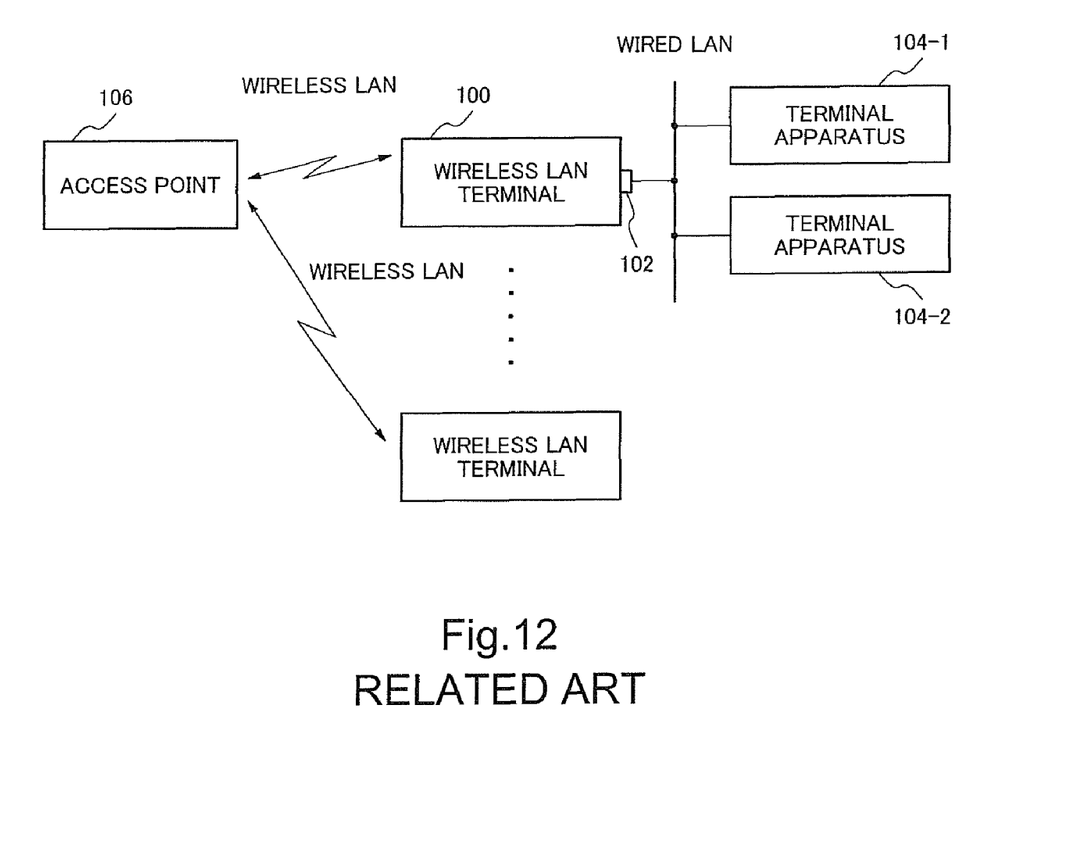
FIG. 12 is an example of a block diagram of a general wireless LAN system including a wireless LAN terminal which communicates with an access point via a wireless LAN and communicates with a terminal apparatus via a wired LAN.

Japanese Patent Application Laid-Open No. 2005-277481 discloses a wireless LAN system including a wireless LAN terminal which communicates with an access point via a wireless LAN and also communicates with a terminal apparatus via a wired LAN. FIG. 12 shows a typical block diagram of such a wireless LAN system. Here, it will be shown as an example that a terminal apparatus 104-1 transmits a BC or MC (BroadCast or MultiCast) packet. The BC/MC packet transmitted by the terminal apparatus 104-1 is transmitted to a wireless LAN terminal 100 and a terminal apparatus 104-2. The wireless LAN terminal 100 transmits the BC/MC packet received from the terminal apparatus 104-1 to an access point 106 via the wireless LAN. In this case, the access point 106 transmits back the BC/MC packet to all the wireless LAN terminals including the wireless LAN terminal 100. The wireless LAN terminal 100 outputs the BC/MC packet to a wired LAN port 102. That is, the terminal apparatus 104-1 connected with the wired LAN port 102 receives the BC/MC packet which the terminal apparatus 104-1 has transmitted. Meanwhile, the terminal apparatus 104-2 connected with the wired LAN port 102 receives again the BC/MC packet already received. Due to such returning and double transmission, traffic in the wired LAN increases.

Meanwhile, a learning bridge function disclosed in Japanese Patent Application Laid-Open No. 1998-285200 or the like is well known. The learning bridge function is specified in IEEE802.1d standard or the like. When a packet is relayed among a plurality of LAN interfaces, the learning bridge function is carried out. When the learning bridge function is installed in the wireless LAN terminal 100 shown in FIG. 12, the wireless LAN terminal 100 learns a MAC address of the terminal apparatus connected with the wired LAN port 102 on the basis of a packet received via the wired LAN port 102. Then, the wireless LAN terminal 100 discards a BC/MC packet transmitted by the terminal apparatus connected with the wired LAN port 102 among the BC/MC packets received from the access point 106 based on a result of the learning. Because of the discarding a packet, the terminal apparatus connected with the wired LAN port 102 does not receive the returned packet and the double transmission packets. Accordingly, increase of the traffic in the wired LAN is suppressed.

SUMMARY

An exemplary object of the present invention is to provide a wireless LAN terminal, a wireless LAN system, a MAC address learning method and a computer program product, which can reduce an unavailable communication time of a terminal apparatus which moves to other LAN port.

According to one aspect of the invention, a wireless LAN terminal includes a wired LAN (Local Area Network) interface, a wireless LAN interface and a bridge unit. The bridge unit detects that a terminal apparatus connected with the wired LAN interface moves to a position under different wireless LAN equipment and learns a MAC (Media Access Control) address of the terminal apparatus which moves.

According to another aspect of the invention, a wireless LAN system includes a wireless LAN terminal which includes a wired LAN interface and a wireless LAN interface. The wireless LAN terminal includes a bridge unit which detects that a terminal apparatus connected with the wired LAN interface moves to a position under different wireless LAN equipment and learns a MAC address of the terminal apparatus which moves.

According to another aspect of the invention, a MAC address learning method in a wireless LAN terminal which includes a wired LAN interface and a wireless LAN interface includes detecting that a terminal apparatus connected with the wired LAN interface moves to a position under different wireless LAN equipment, and learning a MAC address of the terminal apparatus which moves.

According to another aspect of the invention, a program product for a wireless LAN terminal which includes a wired LAN interface and a wireless LAN interface includes a computer-readable program code storage medium. The storage medium stores a program code which can execute a function to detect that a terminal apparatus connected with the wired LAN interface moves to a position under different wireless LAN equipment and a program code which can execute a function to learn a MAC address of the terminal apparatus which moves.

BRIEF DESCRIPTION OF THE DRAWINGS

Exemplary features and advantages of the present invention will become apparent from the following detailed description when taken with the accompanying drawings in which.

EXEMPLARY EMBODIMENTS

First, a problem which a general learning bridge function disclosed in Japanese Patent Application Laid-Open No. 1998-285200 or the like includes will be described below. A wireless LAN (Local Area Network) terminal installing the general learning bridge function carries out transport control (discard or transmission) for a BC/MC (BroadCast/Multi-Cast) packet transmitted by an access point, on the basis of a learning result on a MAC (Media Access Control) address of a terminal apparatus connected to an LAN port of the wireless LAN terminal. Here, "learning" means, for example, recognizing a MAC address and then storing the MAC address in a predetermined memory. Even when the terminal apparatus connected with the LAN port of the wireless LAN terminal is detached from the LAN port and after that connected with a LAN port of other wireless LAN apparatus, the wireless LAN terminal recognizes erroneously that the terminal apparatus is still connected with the own LAN port. That is, the wireless LAN terminal installing the general learning bridge function cannot learn the MAC address of the terminal apparatus which has moved. When the wireless LAN terminal cannot learn the MAC address of the terminal apparatus which has moved, the wireless LAN terminal from which the terminal apparatus has moved judges that a BC/MC packet originated with the moved terminal apparatus is a packet returned by the access point. In such case, the wireless LAN terminal from which the terminal apparatus has moved discards the BC/MC packet to avoid returning and double transmission of the packet. Accordingly, the above-mentioned wireless LAN terminal cannot correctly transfer the BC/MC packet transmitted from the moved terminal apparatus to the wired LAN of the wireless LAN terminal which the moved terminal apparatus has previously connected. In other words, the moved terminal apparatus cannot communicate until learning table time-out of a bridge.

Figure 1:
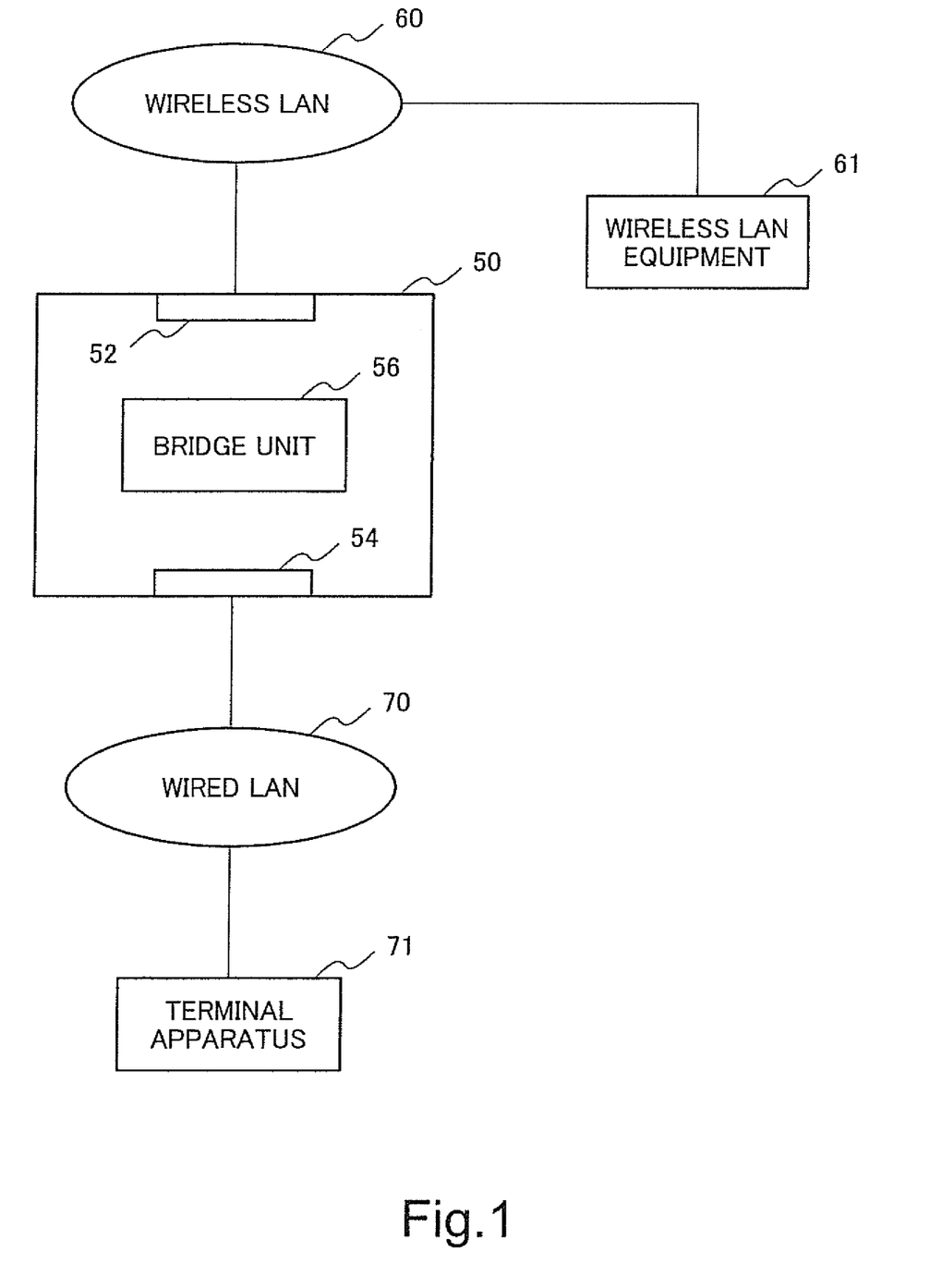
FIG. 1 is an example of a block diagram showing a wireless LAN system including a wireless LAN terminal according to a first embodiment of the present invention.

The above-mentioned problem is settled with an embodiment of the present invention described hereinafter in detail with reference to a drawing. FIG. 1 is a block diagram showing an example of a system including a wireless LAN terminal 50 according to a first embodiment of the present invention. The wireless LAN terminal 50 includes a wireless LAN interface 52 and an Ethernet (registered trademark) interface (wired LAN interface) 54. The wireless LAN interface 52 connects with an wireless access point (not shown, hereinafter, referred to as access point) via a wireless LAN 60. Wireless LAN equipment 61 is connected to the wireless LAN 60. The wired LAN interface 54 connects with a terminal apparatus 71 such as a PC (Personal Computer) via a wired LAN 70. The terminal apparatus 71 can move from a position under or connected with the wireless LAN terminal 50 to a position under or connected with different wireless LAN equipment 61.

The wireless LAN terminal 50 includes a bridge unit 56. The bridge unit 56 detects that the terminal apparatus 71 connected with the wired LAN interface 54 has moved to the position under the different wireless LAN equipment 61, and then learns a MAC (Media Access Control) address of the terminal apparatus 71 which has moved. Here, "learning" means, for example, recognizing a MAC address and storing the MAC address in a predetermined memory. When the terminal apparatus 71 moves to the position under the wireless LAN equipment 61, the wireless LAN terminal 50 with which the terminal apparatus 71 is connected before moving does not discard a BC/MC packet which is transmitted by the terminal apparatus 71 after moving, since the MAC address is learned. As a result, the BC/MC packet from the terminal apparatus 71 after moving is transferred to the wired LAN 70 of the wireless LAN terminal 50 which the terminal apparatus 71 has previously connected. Therefore, the terminal apparatus 71 which has moved to the position under the wireless LAN equipment 61 does not need to postpone communication until the learning table time-out of the bridge. That is, an unavailable time for communication of the terminal apparatus 71 which has moved to the wired LAN port of the different wireless LAN equipment 61 is reduced.

Figure 2:
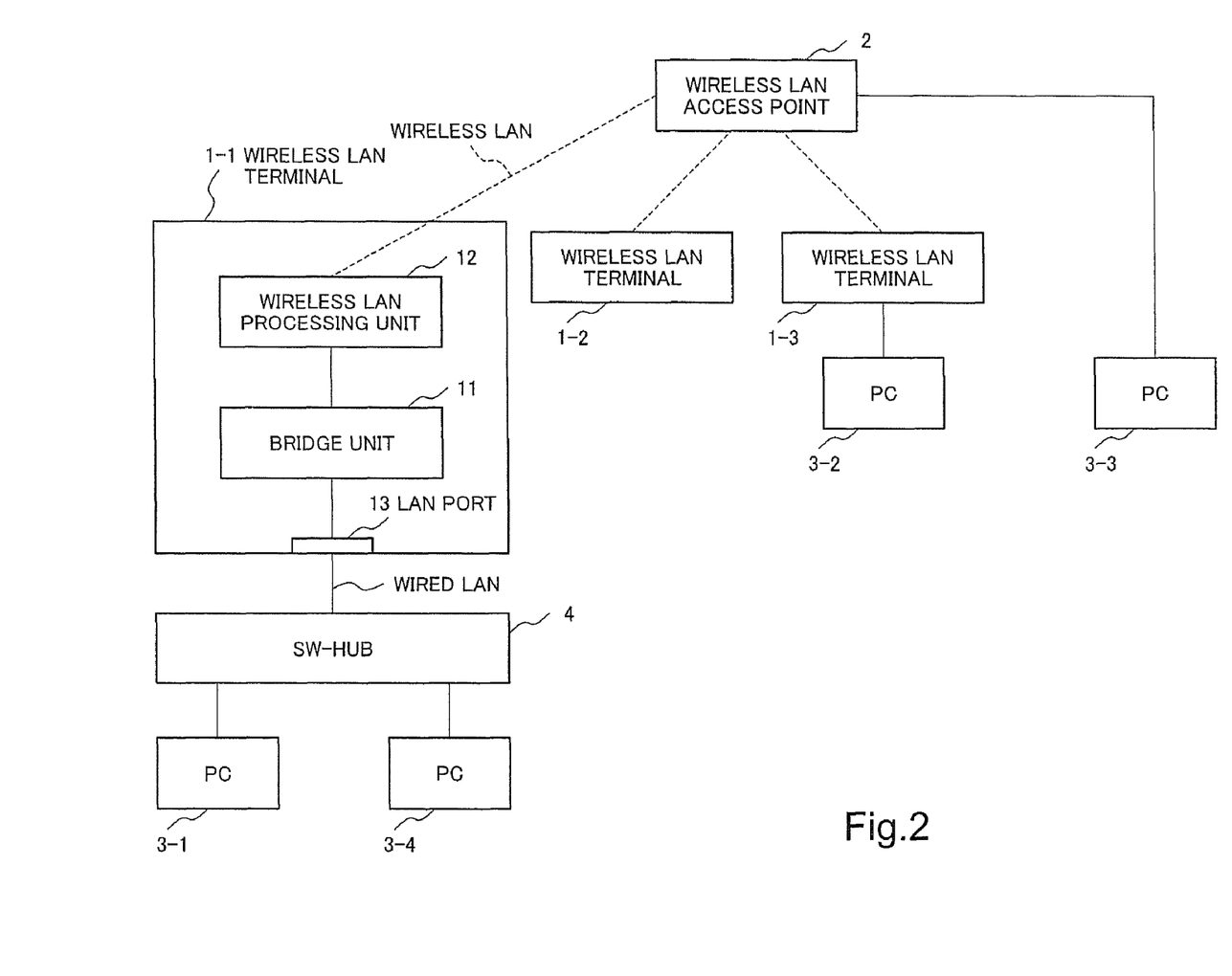
FIG. 2 is an example of a block diagram showing a wireless LAN system including a wireless LAN terminal according to a second embodiment of the present invention.

FIG. 2 shows an example of a block diagram showing a wireless LAN system including a wireless LAN terminal 1-1 according to a second embodiment of the present invention.

The wireless LAN terminal 1-1 includes an Ethernet interface (wired LAN interface) and a wireless LAN interface. That is, the wireless LAN terminal 1-1 includes a LAN port 13 and relays communication between a PC (or referred to as a terminal apparatus) 3-1 or a PC 3-4 connected with the LAN port 13 and a PC 3-2 connected with other wireless LAN terminal 1-3 or a PC 3-3 connected with a wireless access point (hereinafter, referred to as an access point) 2. For example, the wireless LAN terminal 1-1 transmits a BC/MC packet transmitted from the PC 3-1 or the PC 3-4 to the access point 2. The access point 2 transmits the BC/MC packet to all the wireless LAN terminals 1-1 to 1-3 using a predetermined format. Further, the PC 3-1 and PC 3-4 are connected with the LAN port 13 via a SW HUB (software switch hub) 4.

The wireless LAN terminal 1-1 includes a bridge unit 11 and a wireless LAN processing unit 12. The wireless LAN processing unit 12 carries out a wireless LAN communication process based on IEEE802.11a, b, g, n or the like. The wireless LAN processing unit 12 converts a packet received from the access point 2 into an Ethernet packet and transmits the Ethernet packet to the bridge unit 11. The wireless LAN processing unit 12 converts a received Ethernet packet from the bridge unit 11 into a wireless LAN packet and transmits the wireless LAN packet to the access point 2.

The bridge unit 11 learns a source MAC address of the received Ethernet packet from the wireless LAN processing unit 12 and the LAN port 13, and transmits the received Ethernet packet to a corresponding port on which a destination MAC address is registered with reference to information (that is, newly registered information or updated information to be stored) on which learning is already completed. When the bridge unit 11 receives a BC/MC packet from the wireless LAN processing unit 12 after a predetermined time has passed since the latest learning of the MAC address, the bridge unit 11 updates a learning table mentioned below and transfers the received packet to the LAN port 13.

Figure 3:
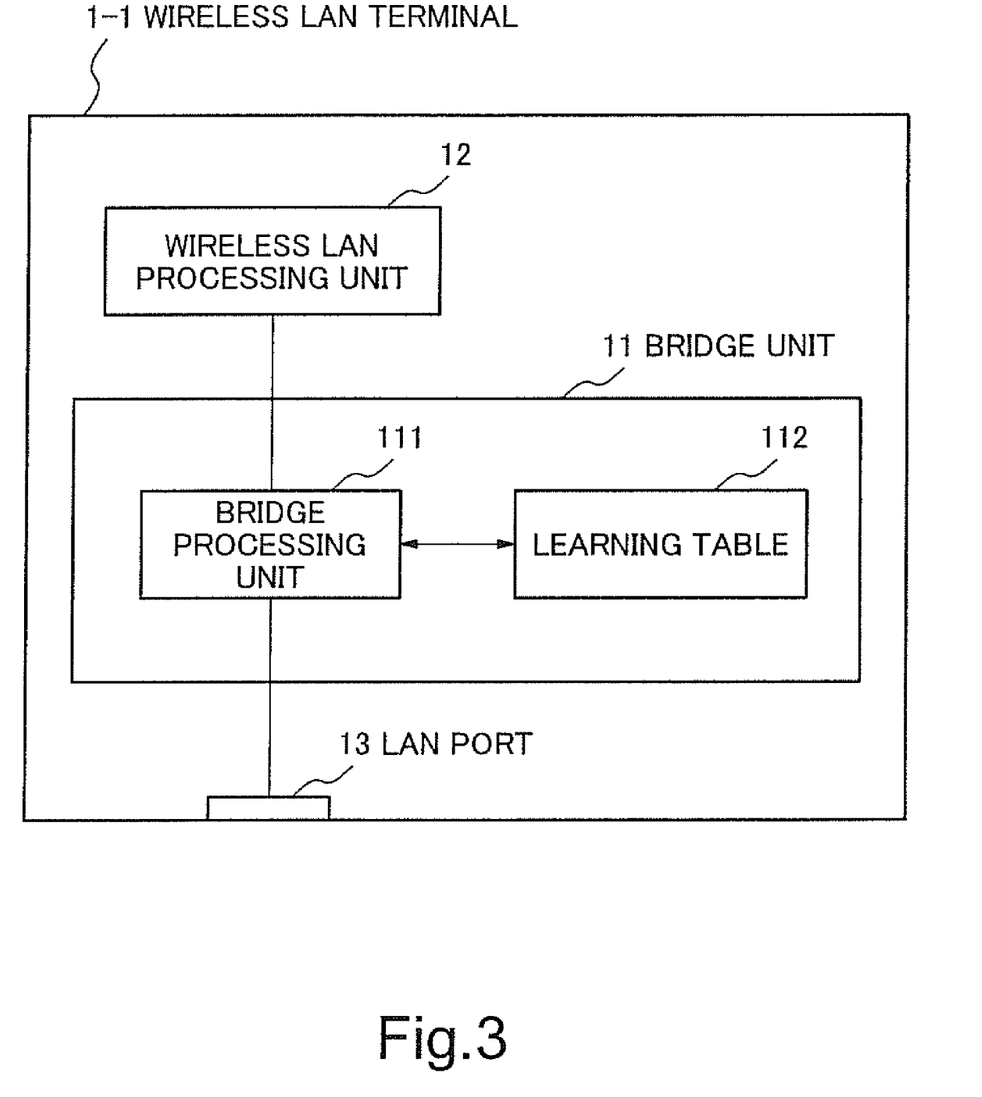
FIG. 3 is an example of a detailed block diagram of the wireless LAN terminal shown in FIG. 2.

FIG. 3 shows an example of a detailed control block diagram of the wireless LAN terminal 1-1 shown in FIG. 2. The wireless LAN terminal 1-1 includes the bridge unit 11, the wireless LAN processing unit 12 and the LAN port 13.

The wireless LAN processing unit 12 has been described. Descriptions thereon are omitted here.

The bridge unit 11 carries out a control process for packet transferring between a wireless LAN and a wired LAN. The bridge unit 11 includes a bridge processing part 111 which carries out a transmitting process for a packet and a process for learning a MAC address, and includes a learning table 112 storing a learning result.

The bridge processing unit 111 learns the source MAC address of the received Ethernet packet received from the wireless LAN processing unit 12 and the LAN port 13 (LAN interface) and writes the learning result in the learning table 112. The bridge processing unit 111 searches the learning table 112 with reference to the destination MAC address of the received packet as a searching key, and carries out a transmission process based on the search result.

Moreover, when it is judged that a BC/MC packet is received from the wireless LAN processing unit 12 after a predetermined time period "T2" (T2 will be described below) has passed since the latest learning of a MAC address with reference to the learning table 112, the bridge processing unit 111 updates the learning table 112 with the MAC address of the received packet. The learning table 112 is referred by the bridge processing unit 111, and stores the learning result obtained by the bridge processing unit 111.

Figure 4A:
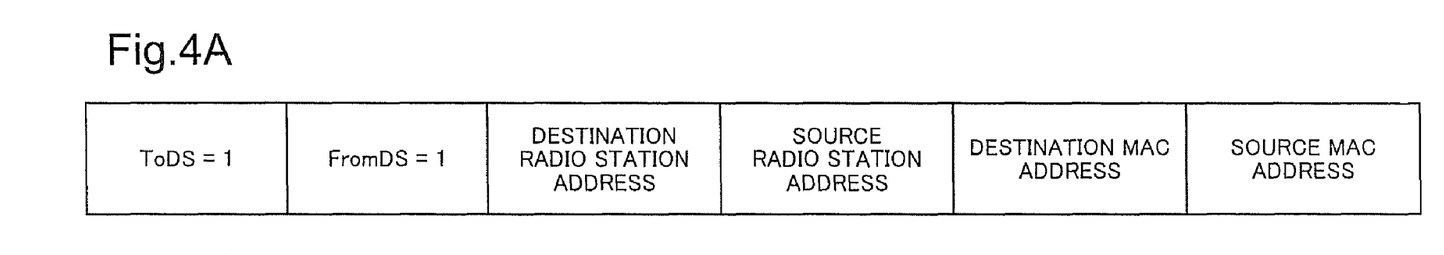
FIGS. 4A, 4B and 4C show frame formats of a wireless LAN each of which a wireless LAN processing unit shown in FIG. 2 transmits or receives.
Figure 4B:
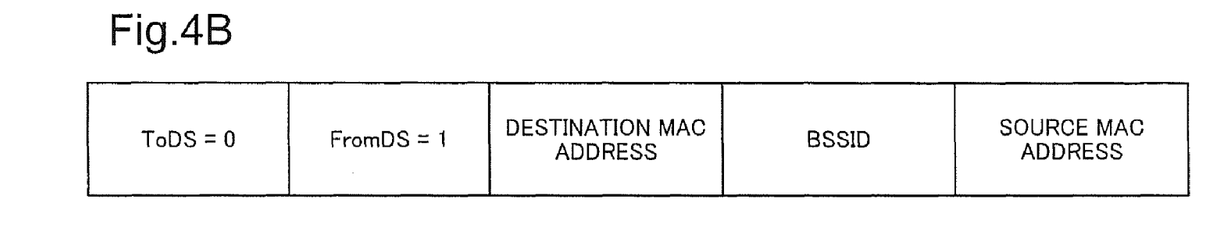
Figure 4C:
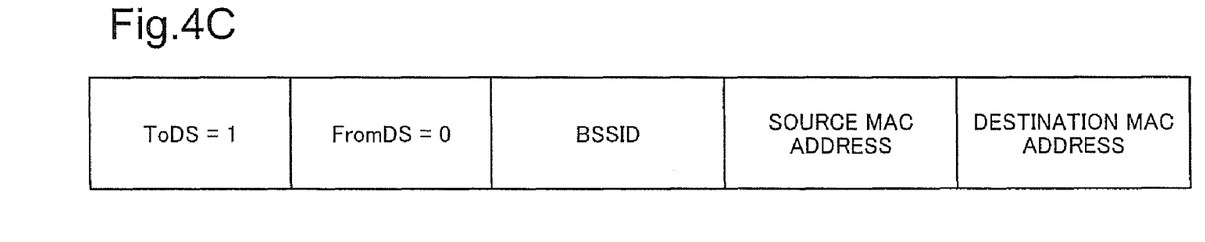

FIGS. 4A, 4B and 4C show frame formats of a wireless LAN each of which the wireless LAN processing unit 12 shown in FIG. 2 transmits or receives. Frame transmission from the wireless LAN terminals 1-1 to 1-3 is performed using a frame format shown in FIG. 4A. When a frame is received from the access point 2, a frame format shown in FIG. 4A is used for a unicast frame, and a frame format shown in FIG. 4B is used for a BC/MC frame. Further, the wireless LAN terminal 1-2 which is a general type of the wireless LAN terminal transmits a frame having a frame format shown in FIG. 4C to the access point 2 and receives a frame having the frame format shown in FIG. 4B from the access point 2.

Figure 5:
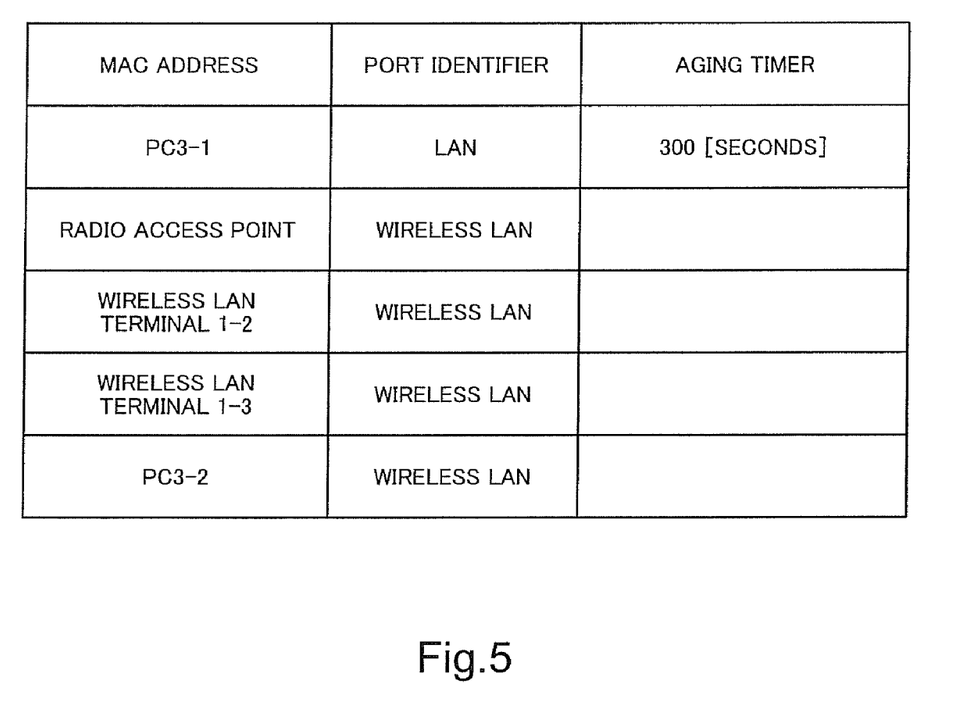
FIG. 5 shows a detailed content of a learning table shown in FIG. 3.

FIG. 5 shows a detailed content of the learning table 112 shown in FIG. 3. The learning table 112 includes a source MAC address, a port identifier and an aging timer. A time value "T1" as the aging timer upon registering an entry, and the registered entry is deleted when the time value "T1" becomes zero according to countdown. Here, the time value "T1" is generally about 300 seconds.

According to FIG. 3, the bridge processing unit 111 carries out processes of transmission/reception of a packet between the wireless LAN processing unit 12 and the LAN port 13. Receiving a packet from the LAN port 13, the bridge processing unit 111 newly registers a source MAC address and a port identifier of the receiving port in the learning table 112 or updates the learning table 112 with the source MAC address and the port identifier of the receiving port. Next, the bridge processing unit 111 searches the learning table 112 with reference to the destination MAC address of the packet as a searching key. If the port identifier of the entry does not correspond to the LAN port 13, the bridge processing unit 111 presumes that the destination address is located in the wireless LAN and transmits the received packet to the wireless LAN processing unit 12.

On the other hand, receiving a packet from the wireless LAN processing unit 12, the bridge processing unit 111 newly registers a source MAC address and a port identifier of the receiving port in the learning table 112 or updates the learning table 112 with the source MAC address and the port identifier of the receiving port when the destination address is an unicast MAC address. Next, the bridge processing unit 111 searches the learning table 112 with reference to the destination MAC address of the packet as a searching key. If the port identifier of the entry does not correspond to the wireless LAN, the bridge processing unit 111 transmits the received packet to the LAN port 13. On the other hand, if the destination address of the packet received from the wireless LAN processing unit 12 is a BC/MC MAC address, the bridge processing unit 111 searches an entry of the learning table 112 and consequently carries out transmission, discard or update of the learning table 112 (relearning) according to the entry information.

Next, a process of the wireless LAN processing unit 12 will be described below. In FIG. 3, the wireless LAN processing unit 12 transmits and receives a radio frame to and from the access point 2. That is, the wireless LAN processing unit 12 transmits a packet received from the bridge processing unit 111 to the access point 2, and transmits a packet received from the access point 2 to the bridge processing unit 111. Receiving a packet from the bridge processing unit 111, the wireless LAN processing unit 12 transmits the packet having a frame format shown in FIG. 4A to the access point 2. Meanwhile, when the wireless LAN processing unit 12 receives a unicast packet from the access point 2, the packet includes a frame format shown in FIG. 4A. Moreover, when the wireless LAN processing unit 12 receives a BC/MC packet from the access point 2, the packet includes a frame format shown in FIG. 4B. Then, the wireless LAN processing unit 12 converts the received packet into an Ethernet packet and transmits the Ethernet packet to the bridge processing unit 111.

Figure 6:
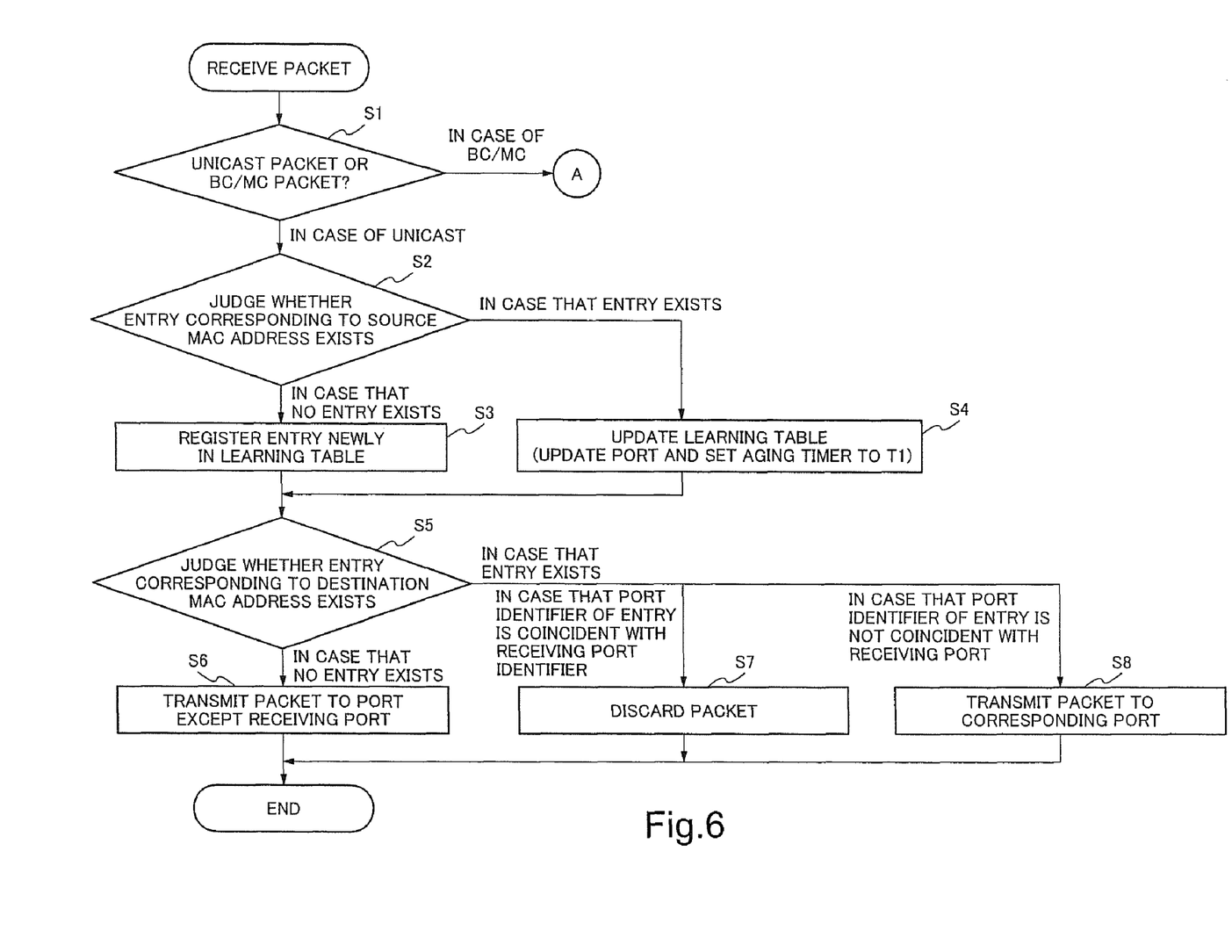
FIG. 6 is a flowchart illustrating an example of a process in a bridge processing unit shown in FIG. 3, and in particular, a process in the bridge processing unit when a received packet is an unicast packet.

Next, an operation of the bridge processing unit 111 will be described below. FIG. 6 is a flowchart illustrating an example of an operation in the bridge processing unit 111 shown in FIG. 3 and, in particular, an operation in the bridge processing unit 111 regarding a received unicast packet.

The bridge processing unit 111 judges whether a packet received from the wireless LAN processing unit 12 or the LAN port 13 (LAN interface) is a unicast packet or a BC/MC packet (Step S1).

If the received packet is a unicast packet, the bridge processing unit 111 carries out a process equivalent to a process carried out by a learning bridge which is generally defined by standard such as IEEE802.1d. That is, the bridge processing unit 111 searches the learning table 112 with reference to the source MAC address of the received packet as a searching key, and judges existence of corresponding entry (Step S2).

If the entry is found, the bridge processing unit 111 updates the entry in the learning table 112 (Step S4). Here, update of entry means specifically a process to update a receiving port identifier of a hit entry and a process to set an aging timer to the time value T1.

If no hit entry is found in the learning table 112, the bridge processing unit 111 newly registers an entry in the learning table 112 (Step S3). Specifically, the bridge processing unit 111 registers the source MAC address and the receiving port identifier of the packet in the learning table 112 and sets the aging timer to the time value T1.

Next, the bridge processing unit 111 searches the learning table 112 with reference to the destination MAC address of the received packet as a searching key, and judges existence of the corresponding entry (Step S5).

If no entry is found in the learning table 112 ("no entry" in Step S5), the bridge processing unit 111 transmits the received packet to a port other than the receiving port (Step S6).

On the other hand, if the corresponding entry is found in the learning table 112 and the port identifier of the entry is not coincident with the receiving port identifier, the bridge processing unit 111 transmits the received packet to a port which the port identifier thereof indicates (Step S8).

Moreover, when the corresponding entry is found in the learning table 112 and the port identifier of the entry is coincident with the receiving port identifier, the bridge processing unit 111 discards the packet without transmitting the received packet to any port (Step S7).

Figure 7:
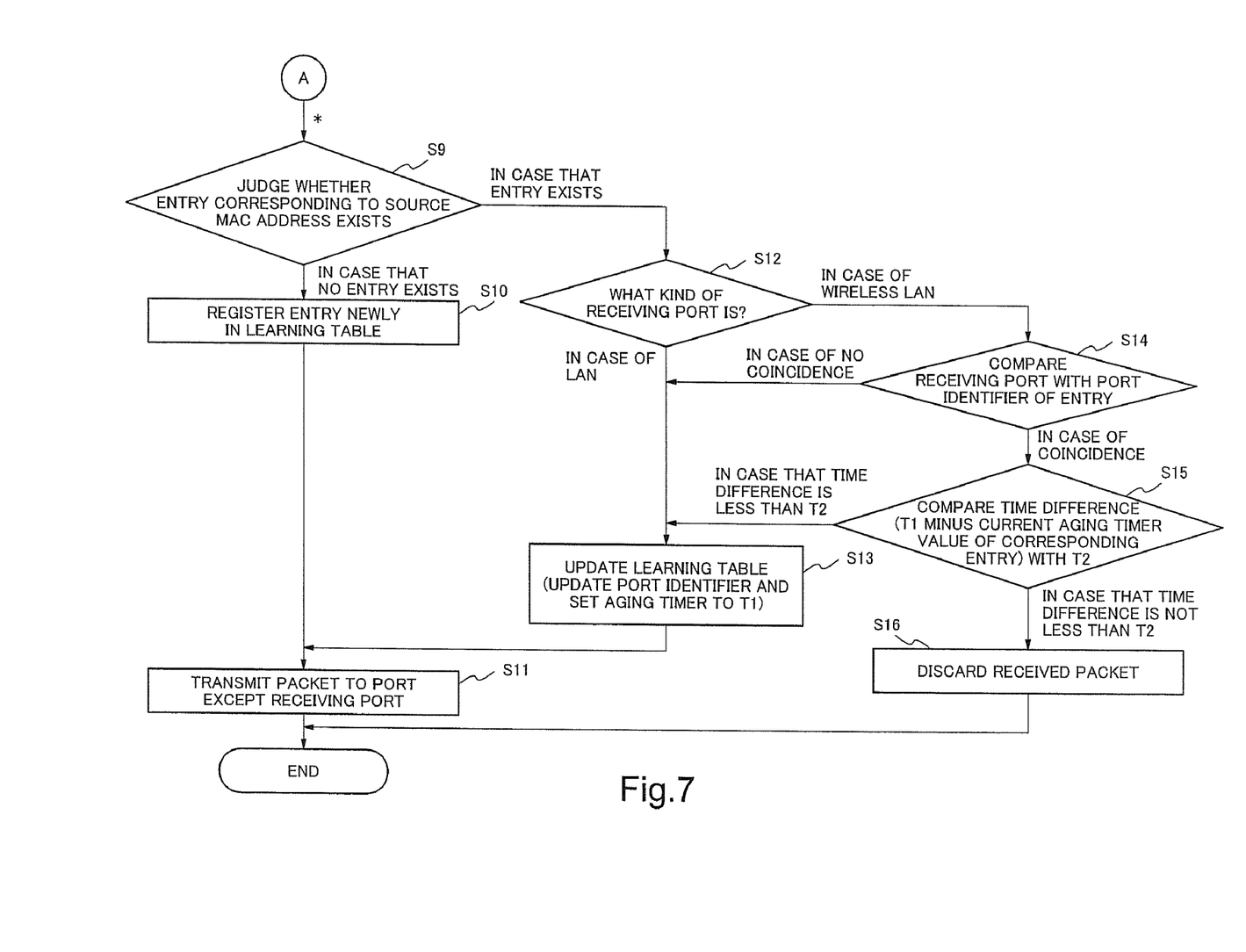
FIG. 7 is a flowchart illustrating an example of a process in the bridge processing unit shown in FIG. 3, and in particular, a process in the bridge processing unit when the received packet is a broadcast or multicast packet.

FIG. 7 is a flowchart illustrating an example of a process in the bridge processing unit shown in FIG. 3 and in particular, a process in the bridge processing unit regarding a received BC/MC packet.

when the bridge processing unit 111 judges that the received packet is a BC/MC packet in step S1 of FIG. 6, the bridge processing unit 111 carries out processes of S9 to S16 shown in FIG. 7. Upon reception of the BC/MC packet, the bridge processing unit 111 searches the learning table 112 with reference to the destination MAC address of the received packet as a searching key, and judges existence of the corresponding entry (Step S9).

When no hit entry is found in the learning table 112, the bridge processing unit 111 newly registers an entry in the learning table 112 (Step S10) and transmits the packet to a port other than the receiving port (Step S11).

On the other hand, when a hit entry is found, the bridge processing part 111 judges whether or not the receiving port is the LAN port 13 (Step S12). When the receiving port is the LAN port 13, the bridge processing unit 111 updates the learning table 112 (Step S13). Specifically, the bridge processing part 111 updates the port identifier of the learning table 112 with the port identifier of the receiving port and sets the aging timer to the time value T1. Then, the bridge processing unit 111 transmits the packet to a port other than the receiving port (Step S11).

On the other hand, when the receiving port is the wireless LAN port, the bridge processing unit 111 compares the port identifier of the hit entry with the receiving port identifier (Step S14). When the port identifier of the hit entry is not coincident with the receiving port identifier, the bridge processing unit 111 updates the learning table 112 (Step S13). Specifically, the bridge processing unit 111 updates the port identifier of the learning table 112 with the port identifier of the receiving port and sets the aging timer to the time value "T1". Furthermore, the bridge processing unit 111 transmits the packet to a port other than the receiving port (Step S11).

On the other hand, when the port identifier of the hit entry is coincident with the receiving port identifier, the bridge processing unit 111 calculates a difference between time value "T1" and the current aging timer value and compares the time value difference with the time value T2 (Step S15). Here, the time value T2 means a period of time within which a packet transmitted by the wireless LAN terminal 1-1 to the access point 2 can not reach the wireless LAN terminal 1-1 even if the packet is returned from the access point 2, and the time value T2 is set, for example, to about several seconds.

If the time value difference is no less than the time value T2, the bridge processing unit 111 judges that the terminal apparatus has moved from the wireless LAN terminal 1-1 to a LAN port of a different wireless LAN terminal, and updates the learning table 112 (Step S13). Specifically, the bridge processing unit 111 updates the port identifier of the learning table 112 with the port identifier of the receiving port and sets the aging timer to the time value T1. Furthermore, the bridge processing unit 111 transmits the packet to a port other than the receiving port (Step S11).

If the time value difference is less than the time value T2, the bridge processing unit 111 judges that the received packet is a packet transmitted by the wireless LAN terminal 1-1 and the received packet is also a packet returned from the access point 2. Then, the bridge processing unit 111 discards the received packet (Step S16). Because of the packet discard, a terminal apparatus connected with the LAN port 13 does not receive the turned packet and the double packets.

According to the second embodiment of the present invention described above, it is judged on the basis of the latest time point on learning the MAC address whether or not a process of relearning is carried out with reference to the BC/MC packet received from the wireless LAN. Accordingly, the wireless LAN terminal 1-1 can discard the BC/MC packet which the wireless LAN terminal 1-1 transmits to the access point 2 and the access point 2 returns to the wireless LAN terminal 1-1. Moreover, the wireless LAN terminal 1-1 performs relearning on the terminal apparatus which has moved, based on the BC/MC packet transmitted from the terminal apparatus (for example, PC3-1) which has moved to the LAN port of different wireless LAN equipment (wireless LAN terminal 1-2, for example). Accordingly, the terminal apparatus (PC3-1) connected with the wireless LAN terminal 1-2) which has moved enters into a state in which communication is available in a short time after moving due to the aging timer of the learning table. That is, it is possible to reduce an unavailable communication time of the terminal apparatus which has moved to other LAN port.

When a period of time from a time point of the latest receiving a packet transmitted from the terminal apparatus which is connected with the LAN port 13 to a time point of receiving a BC/MC packet from the access point 2 is equal to or longer than the predetermined time period (time value "T2"), the wireless LAN terminal 1-1 judges that the terminal apparatus has moved to a LAN port of the different wireless LAN equipment. That is, the wireless LAN terminal 1-1 can judge whether the BC/MC packet received from the access point is a packet which the wireless LAN terminal 1-1 transmits and which the access point 2 returns or a packet which the different wireless LAN equipment which is a destination of the terminal apparatus transmits via the access point 2.

Furthermore, since the wireless LAN terminal 1-1 according to the second embodiment of the present invention can distinguish reception of the packet received from the terminal apparatus which has moved from the returned BC/MC packet from the access point 2 by using the timer, relearning of the MAC address is carried out quickly.

Moreover, the wireless LAN terminals 1-1 according to the second embodiment of the present invention can discard the returned packet from the access point 2. Accordingly, it is possible to avoid a problem that whole of the LAN becomes unavailable due to repeated copying of the packet.

Figure 8:
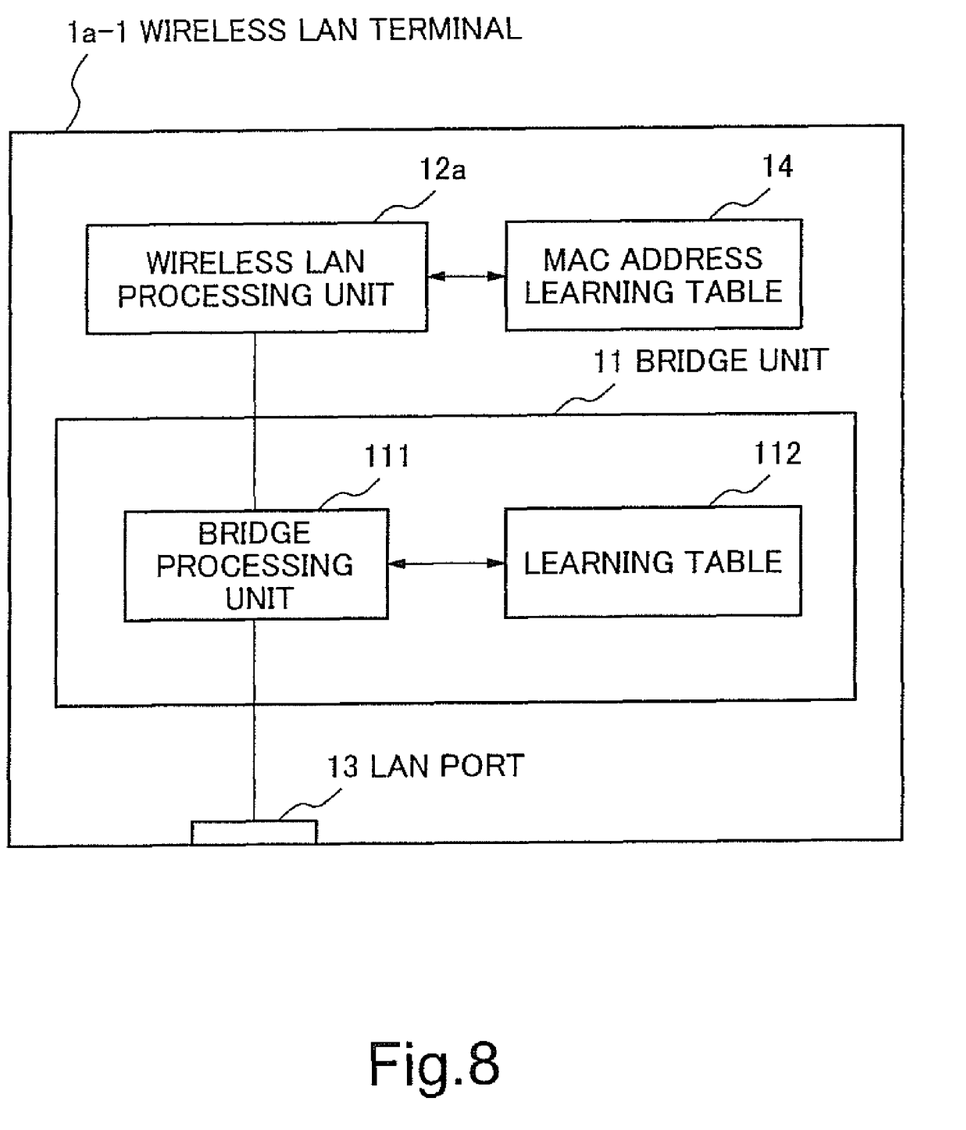
FIG. 8 is an example of a detailed block diagram of a wireless LAN terminal according to a third embodiment of the present invention.
Figure 9:
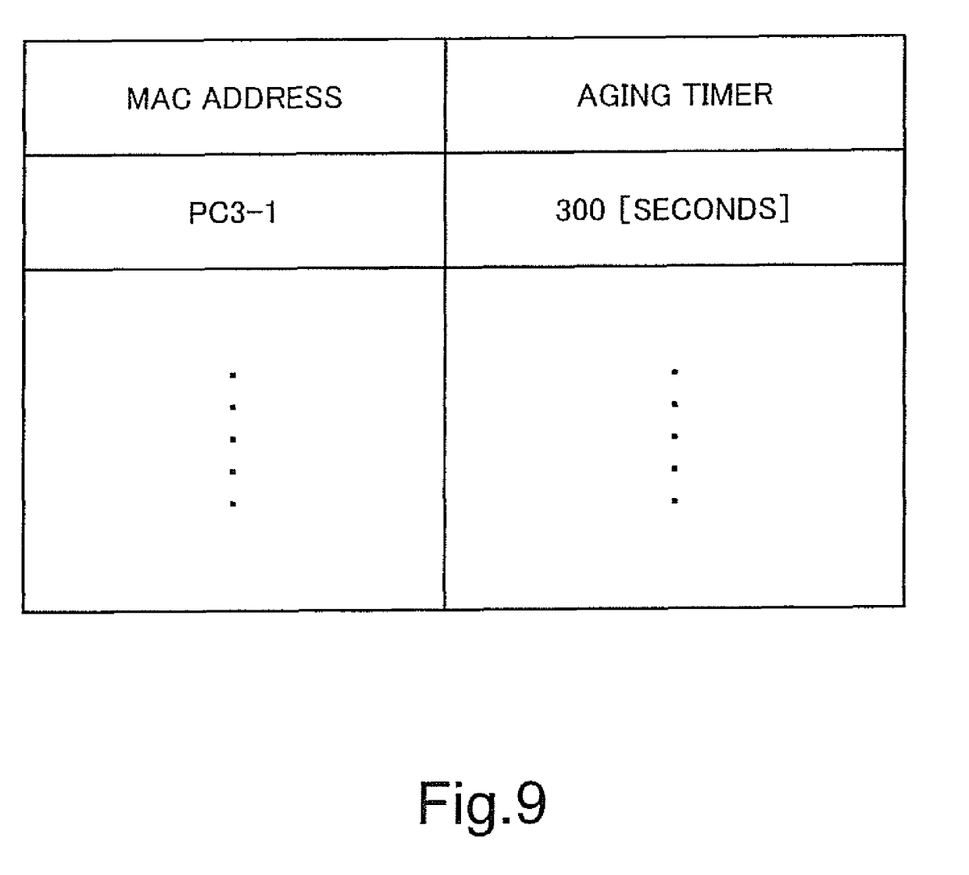
FIG. 9 is an example of a content of a MAC address learning table shown in FIG. 8.

FIG. 8 is an example of a detailed control block diagram of a wireless LAN terminal according to a third embodiment of the present invention. FIG. 9 is an example of a content of the MAC address learning table shown in FIG. 8. A wireless LAN terminal 1*a*-1 according to the third embodiment of the present invention includes a feature that a way of the MAC address learning is improved.

The wireless LAN terminals 1*a*-1 include a bridge unit 11, a wireless LAN processing unit 12*a*, a LAN port 13 and a MAC address learning table 14.

The bridge unit 11 carries out a process of transporting a packet from the LAN port 13 and the wireless LAN port. The bridge unit 11 includes a bridge processing unit 111 which carries out the transport process and a learning process of a MAC address, and a learning table 112 which stores the learning result. Here, the bridge unit 11 includes a configuration equivalent to that of a general bridge. That is, the bridge processing unit 111 learns a source MAC address of a packet which is received from the LAN port 13 and the wireless LAN processing unit 12*a*, registers the source MAC address in the learning table 112, and determines a destination port based on information in the learning table 112 and a destination MAC address of the packet. The learning table 112 includes a configuration identical to the configuration shown in FIG. 5 and includes a MAC address, a port identifier and an aging timer. The aging timer is set to a time value "T1" as an initial value when an address is registered in the learning table 112, and the registered entry is deleted when the aging timer is reduced to zero according to countdown of the aging timer.

The wireless LAN processing unit 12a carries out a wireless LAN communication process such as IEEE802.11a, b, g and n. The Wireless LAN processing unit 12a stores the source MAC address of a BC/MC packet received from the LAN port 13 in the MAC address learning table 14. Upon reception of the BC/MC packet from the wireless LAN port, the wireless LAN processing unit 12a searches the MAC address learning table 14 with reference to the source MAC address as a searching key. When the source MAC address is hit, the wireless LAN processing unit 12a discards the packet. On the other hand, when the source MAC address is not hit, the wireless LAN processing unit 12a transfers the packet to the bridge processing part 11.

The MAC address learning table 14 includes the MAC address and the aging timer as shown in FIG. 9 and a referring process or a storing process therein is carried out by the wireless LAN processing unit 12a. When the address is registered in the MAC address learning table initially, the aging timer is set to a time value "T2". When the aging timer is reduced to zero according to countdown, the entry is deleted.

Figure 10:
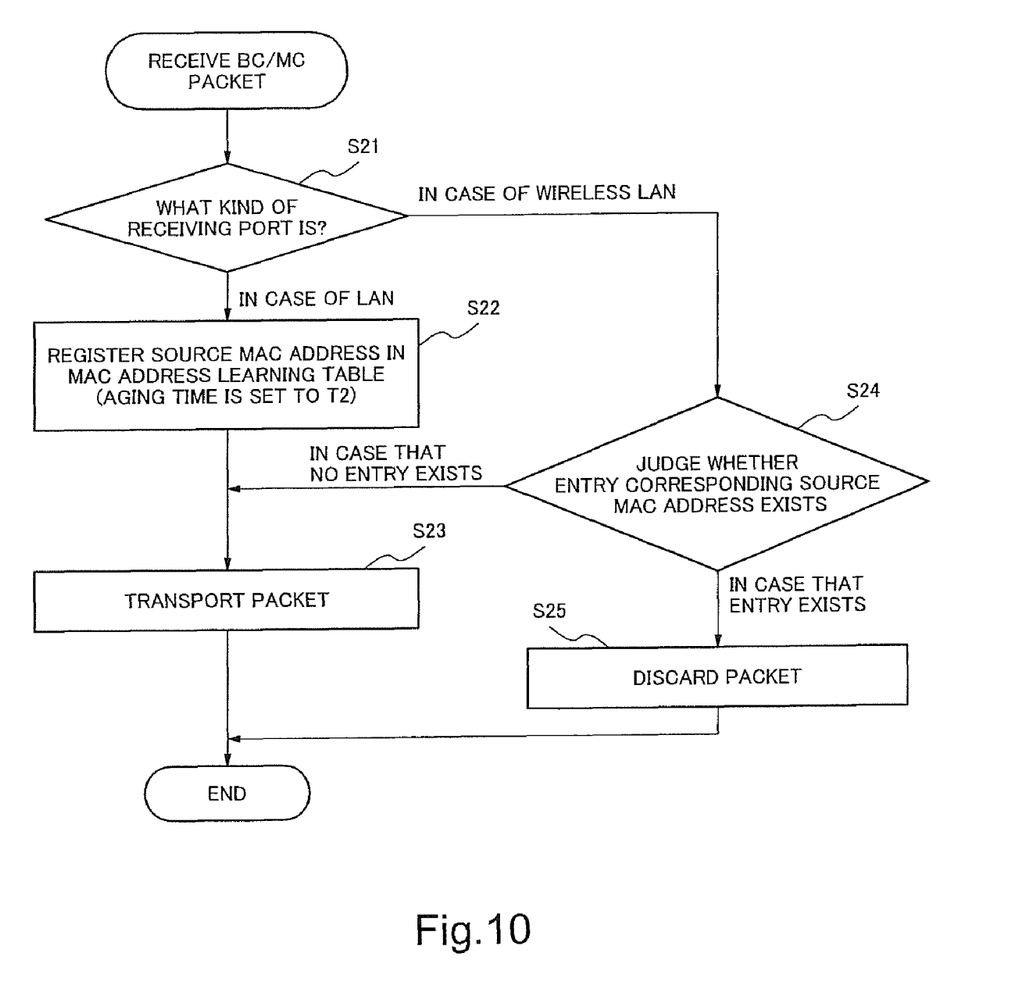
FIG. 10 is a flowchart illustrating an example of a process in the wireless LAN processing unit shown in FIG. 8.

FIG. 10 is a flowchart illustrating an example of process in the wireless LAN processing unit 12a shown in FIG. 8. Further, FIG. 10 does not show a process of the wireless LAN processing unit 12a which is carried out when the wireless LAN processing unit 12a receives an unicast packet from the wireless LAN port or the LAN port 13, but FIG. 10 shows only process of the wireless LAN processing unit 12a which is carried out when the wireless LAN processing unit 12a receives the BC/MC packet. By the way, upon reception of the unicast packet from the wireless LAN port or the LAN port 13, the wireless LAN processing unit 12a transfers the packet to the bridge processing unit 111 as it is.

Meanwhile, receiving the BC/MC packet from the bridge processing unit 111, the wireless LAN processing unit 12a judges whether the receiving port is the LAN port 13 or the wireless LAN port (Step S21). If the receiving port is found to be the LAN port 13, the wireless LAN processing unit 12a registers the aging timer having the time value "T2" of the source MAC address in the MAC address learning table 14 (Step S22). Then, the wireless LAN processing unit 12a transfers the received packet to the wireless LAN port (Step S23).

On the other hand, when the receiving port is found to be the wireless LAN port, the wireless LAN processing unit 12a searches the MAC address learning table 14 with reference to the source MAC address as a searching key, and checks existence of hit entry (Step S24). If no hit entry is found, the wireless LAN processing unit 12a transfers the received packet to the bridge processing unit 111 (Step S23). If the hit entry is found, the wireless LAN processing unit 12a discards the received packet (Step S25).

The bridge processing unit 111 carries out an identical process with a process of usual bridge. That is, the bridge processing unit 111 learns the source MAC address of each received packet, registers the source MAC address in the learning table 112, learns the destination MAC address, searches the learning table 112 and returns the packet to the destination port.

As described above, according to the embodiments of the present invention, since the bridge unit 11 carries out an identical process with a process of an existing bridge, it is possible to prevent returning of BC/MC packet and to carry out quick relearning without changing an existing function.

Figure 11:
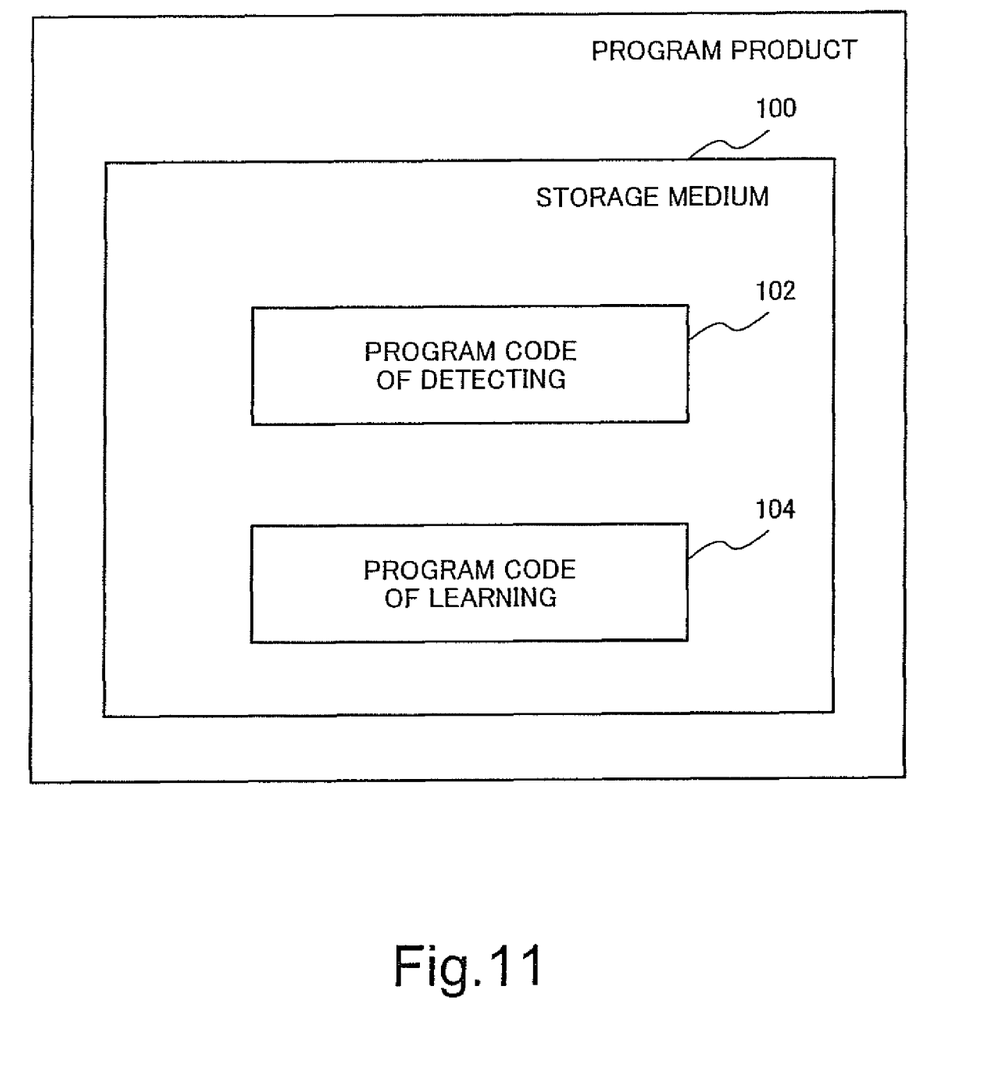
FIG. 11 is an example of a content of a program product for a wireless LAN terminal which includes a wired LAN interface and a wireless LAN interface according to an embodiment of the present invention.

FIG. 11 is an example of a content of a program product for a wireless LAN terminal which includes a wired LAN interface and a wireless LAN interface according to an embodiment of the present invention. The program product includes a computer-readable program code storage medium 100. The storage medium 100 stores a program code of detecting 102 and a program code of learning 104. The program code 102 can execute a function to detect that a terminal apparatus connected with the wired LAN interface moves to a position under different wireless LAN equipment. The program code 104 can execute a function to learn a MAC address of the terminal apparatus which moves.

Further, the program code 102 can include a program code to judge whether or not a period of time from a time point of the latest receiving a packet transmitted from the terminal apparatus which is connected with the wired LAN interface to a time point of receiving a broadcast/multicast packet via the wireless LAN interface is not shorter than a predetermined period of time.

The above-mentioned program codes are executed with CPU (Central Processing Unit) of the wireless LAN terminal.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A wireless LAN terminal, comprising:
   a wired LAN (Local Area Network) interface;
   a wireless LAN interface; and
   a bridge unit which detects that a terminal apparatus connected with said wired LAN interface moves to a position under different wireless LAN equipment and learns a MAC (Media Access Control) address of said terminal apparatus which moves, and
   wherein said bridge unit judges whether or not a period of time from a time point of the latest receiving a packet transmitted from said terminal apparatus which is connected with said wired LAN interface to a time point of receiving a broadcast/multicast packet via said wireless LAN interface is not shorter than a predetermined period of time, and
   wherein when said period of time from said time point of the latest receiving said packet transmitted from said terminal apparatus which is connected with said wired LAN interface to said time point of receiving said broadcast/multicast packet via said wireless LAN interface is not shorter than said predetermined period of time, said bridge unit judges that said received packet is a broadcast/multicast packet which is transmitted from said different wireless LAN equipment via said wireless LAN interface.

2. The wireless LAN terminal according to claim 1, further comprising:
   a learning table which includes a source MAC address, a port identifier and an aging timer, wherein when said period of time from said time point of the latest receiving said packet transmitted from said terminal apparatus which is connected with said wired LAN interface to said time point of receiving said broadcast/multicast packet via said wireless LAN interface is not shorter than said predetermined period of time, said bridge unit updates said learning table.

3. The wireless LAN terminal according to claim 2, wherein
said process to update said learning table includes a process to update said port identifier with a port identifier of a receiving port and a process to reset an aging timer to a predetermined initial value.

4. The wireless LAN terminal according to claim 1,
wherein when said period of time from said time point of the latest receiving said packet transmitted from said terminal apparatus which is connected with said wired LAN interface to said time point of receiving said broadcast/multicast packet via said wireless LAN interface is not shorter than said predetermined period of time, said bridge unit transmits said received packet to a port other than said receiving port.

5. The wireless LAN terminal according to claim 1, wherein
when said period of time from said time point of the latest receiving said packet transmitted from said terminal apparatus which is connected with said wired LAN interface to said time point of receiving said broadcast/multicast packet via said wireless LAN interface is shorter than said predetermined period of time, said bridge unit judges that said received packet is a broadcast/multicast packet which is returned after being transmitted to said wireless LAN interface from said wireless LAN terminal.

6. The wireless LAN terminal according to claim 5, wherein
when said period of time from said time point of the latest receiving said packet transmitted from said terminal apparatus which is connected with said wired LAN interface to said time point of receiving said broadcast/multicast packet via said wireless LAN interface is shorter than said predetermined period of time, said bridge unit discards said received packet.

7. The wireless LAN terminal according to claim 1, wherein
said predetermined period of time is set to be a period of time longer than said period of time from said time point when said bridge unit receives a predetermined packet transmitted from said terminal apparatus connected with said wired LAN interface to the latest time point when said bridge unit receives a returned packet of said predetermined packet via said wireless LAN interface.

8. A wireless LAN system, comprising:
a wireless LAN terminal which includes a wired LAN interface and a wireless LAN interface, wherein said wireless LAN terminal includes a bridge unit which detects that a terminal apparatus connected with said wired LAN interface moves to a position under different wireless LAN equipment and learns a MAC address of said terminal apparatus which moves, and
wherein said bridge unit judges whether or not a period of time from a time point of the latest receiving a packet transmitted from said terminal apparatus which is connected with said wired LAN interface to a time point of receiving a broadcast/multicast packet via said wireless LAN interface is not shorter than a predetermined period of time, and wherein when said period of time from said time point of the latest receiving said packet transmitted from said terminal apparatus which is connected with said wired LAN interface to said time point of receiving said broadcast/multicast packet via said wireless LAN interface is not shorter than said predetermined period of time, said bridge unit judges that said received packet is a broadcast/multicast packet which is transmitted from said different wireless LAN equipment via said wireless LAN interface.

9. The wireless LAN system according to claim 8, further comprising:
a learning table which includes a source MAC address, a port identifier and an aging timer, wherein
when said period of time from said time point of the latest receiving said packet transmitted from said terminal apparatus which is connected with said wired LAN interface to said time point of receiving said broadcast/multicast packet via said wireless LAN interface is not shorter than said predetermined period of time, said bridge unit updates said learning table.

10. The wireless LAN system according to claim 9, wherein
said process to update said learning table includes a process to update said port identifier with a port identifier of a receiving port and a process to reset an aging timer to a predetermined initial value.

11. The wireless LAN system according to claim 8,
wherein when said period of time from said time point of the latest receiving said packet transmitted from said terminal apparatus which is connected with said wired LAN interface to said time point of receiving said broadcast/multicast packet via said wireless LAN interface is not shorter than said predetermined period of time, said bridge unit transmits said received packet to a port other than said receiving port.

12. The wireless LAN system according to claim 8, wherein
when said period of time from said time point of the latest receiving said packet transmitted from said terminal apparatus which is connected with said wired LAN interface to said time point of receiving said broadcast/multicast packet via said wireless LAN interface is shorter than said predetermined period of time, said bridge unit judges that said received packet is a broadcast/multicast packet which is returned after being transmitted to said wireless LAN interface from said wireless LAN terminal.

13. The wireless LAN system according to claim 12, wherein
when said period of time from said time point of the latest receiving said packet transmitted from said terminal apparatus which is connected with said wired LAN interface to said time point of receiving said broadcast/multicast packet via said wireless LAN interface is shorter than said predetermined period of time, said bridge unit discards said received packet.

14. The wireless LAN system according to claim 8, wherein
said predetermined period of time is set to be a period of time longer than said period of time from said time point when said bridge unit receives a predetermined packet transmitted from said terminal apparatus connected with said wired LAN interface to the latest time point when said bridge unit receives a returned packet of said predetermined packet via said wireless LAN interface.

15. A MAC address learning method in a wireless LAN terminal which includes a wired LAN interface and a wireless LAN interface, comprising:
- detecting that a terminal apparatus connected with said wired LAN interface moves to a position under different wireless LAN equipment; and
- learning a MAC address of said terminal apparatus which moves, and
- wherein said detecting that said terminal apparatus connected with said wired LAN interface moves to a position under said different wireless LAN equipment includes judging whether or not a period of time from a time point of the latest receiving a packet transmitted from said terminal apparatus which is connected with said wired LAN interface to a time point of receiving a broadcast/multicast packet via said wireless LAN interface is not shorter than a predetermined period of time, and
- wherein when said period of time from said time point of the latest receiving said packet transmitted from said terminal apparatus which is connected with said wired LAN interface to said time point of receiving said broadcast/multicast packet via said wireless LAN interface is not shorter than said predetermined period of time, it is judged that said received packet is said broadcast/multicast packet which is transmitted from said different wireless LAN equipment via said wireless LAN interface.

16. The MAC address learning method according to claim 15, wherein
- when said period of time from said time point of the latest receiving said packet transmitted from said terminal apparatus which is connected with said wired LAN interface to said time point of receiving said broadcast/multicast packet via said wireless LAN interface is not shorter than said predetermined period of time, a learning table including a source MAC address, a port identifier and an aging timer is updated.

17. The MAC address learning method according to claim 16, wherein
- said updating process to update said learning table includes a process to update said port identifier with a port identifier of a receiving port and a process to reset an aging timer to a predetermined initial value.

18. The MAC address learning method according to claim 15, wherein when said period of time from said time point of the latest receiving said packet transmitted from said terminal apparatus which is connected with said wired LAN interface to said time point of receiving said broadcast/multicast packet via said wireless LAN interface is not shorter than said predetermined period of time, said received packet is transmitted to a port other than said receiving port.

19. The MAC address learning method according to claim 15, wherein
- when said period of time from said time point of the latest receiving said packet transmitted from said terminal apparatus which is connected with said wired LAN interface to said time point of receiving said broadcast/multicast packet via said wireless LAN interface is shorter than said predetermined period of time, it is judged that said received packet is said broadcast/multicast packet which is returned after being transmitted to said wireless LAN interface from said wireless LAN terminal.

20. The MAC address learning method according to claim 19, wherein
- when said period of time from said time point of the latest receiving said packet transmitted from said terminal apparatus which is connected with said wired LAN interface to said time point of receiving said broadcast/multicast packet via said wireless LAN interface is shorter than said predetermined period of time, said received packet is discarded.

21. The MAC address learning method according to claim 15, wherein
- said predetermined period of time is set to be a period of time longer than said period of time from said time point when said bridge unit receives a predetermined packet transmitted from said terminal apparatus connected with said wired LAN interface to the latest time point when said bridge unit receives a returned packet of said predetermined packet via said wireless LAN interface.

22. A non-transitory computer-readable recording medium having embodied thereon a computer program, which when executed by a computer, causes the computer to function as a wireless LAN terminal which includes a wired LAN interface and a wireless LAN interface, the wireless LAN terminal comprising:
- a bridge unit that detects that a terminal apparatus connected with said wired LAN interface moves to a position under different wireless LAN equipment and learns a MAC address of said terminal apparatus which moves, and
- wherein said bridge unit judges whether or not a period of time from a time point of the latest receiving a packet transmitted from said terminal apparatus which is connected with said wired LAN interface to a time point of receiving a broadcast/multicast packet via said wireless LAN interface is not shorter than a predetermined period of time, and
- wherein when said period of time from said time point of the latest receiving said packet transmitted from said terminal apparatus which is connected with said wired LAN interface to said time point of receiving said broadcast/multicast packet via said wireless LAN interface is not shorter than said predetermined period of time, it is judged that said received packet is said broadcast/multicast packet which is transmitted from said different wireless LAN equipment via said wireless LAN interface.

23. A wireless LAN terminal including a wired LAN interface and a wireless LAN interface, comprising:
- a bridge means for detecting that a terminal apparatus connected with said wired LAN interface moves to a position under different wireless LAN equipment and learning a MAC address of said terminal apparatus which moves, and
- wherein said bridge means judge whether a period of time from a time point of the latest receiving a packet transmitted from said terminal apparatus which is connected to said wired LAN interface to a time point on receiving a broadcast/multicast packet via said wireless LAN interface is not shorter than a predetermined time, and
- wherein when said period of time from said time point of the latest receiving said packet transmitted from said terminal apparatus which is connected with said wired LAN interface to said time point of receiving said broadcast/multicast packet via said wireless LAN interface is not shorter than said predetermined period of time, it is judged that said received packet is said broadcast/multicast packet which is transmitted from said different wireless LAN equipment via said wireless LAN interface.

* * * * *